Feb. 2, 1926.

J. B. PITTS

HUNTER'S DECOY DUCK

Filed Oct. 30, 1925

1,571,213

Inventor:
John B. Pitts,
by Robert Burns
Atty.

Patented Feb. 2, 1926.

1,571,213

UNITED STATES PATENT OFFICE.

JOHN B. PITTS, OF WINNETKA, ILLINOIS.

HUNTER'S DECOY DUCK.

Application filed October 30, 1925. Serial No. 65,740.

*To all whom it may concern:*

Be it known that I, JOHN B. PITTS, a citizen of the United States of America, residing at Winnetka, in the county of Cook and State of Illinois, have invented a certain new and useful Improvement in Hunters' Decoy Ducks, of which the following is a specification.

This invention relates to that class of floating objects known as decoy ducks and used by hunters as a lure in the pursuit of game, and the present improvement has for its object.

To provide a simple and efficient structural formation and combination of parts, whereby the head portion of the decoy is pivotally connected to the floating body portion and derives a shaking or oscillatory movement in a horizontal plane from the natural surge or wave action of the body of water in which the decoy floats, all as will hereinafter more fully appear.

In the accompanying drawing—

Like reference numerals indicate like parts in the different views.

Figure 1:
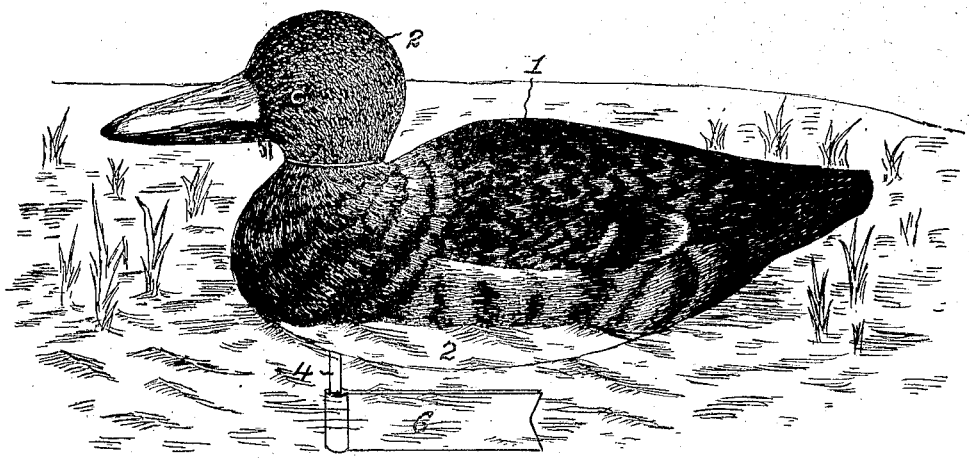
Fig. 1, is a perspective view of a decoy duck to which the invention is applied.

In the present construction the body 1 of the decoy is of the usual buoyant nature, usually of wood carved and painted to resemble the body and appearance of a duck. The head 2 is similarly formed and is made as a separate unit from the body 1 aforesaid.

In this improvement the body portion 1 is formed with a vertical orifice having an aligned relation to the head 2, and extending entirely through said body portion to receive a journal bushing 3 for the stem 4 of the hereinafter described operating vane or blade.

The head portion 2 of the decoy is formed with a vertical recess, complementary to the above mentioned orifice of the body portion 1, for the reception of a fixed and internally screw threaded nipple or sleeve 5, into which is screwed the upper end of the aforesaid stem 4 with such end screw threaded for such purpose, The stem 4 has a turning movement in the journal bushing 3 of the body portion 1, and its lower end extends a distance below said body portion, with such lower end carrying a rearwardly extending vane or blade 6, which in actual use of the decoy is adapted to receive motion from the natural wave or surge of the body of water in which the decoy is placed, and in turn cause a complementary shaking or oscillatory movement of the decoy head 2 in a horizontal plane.

Figure 2:
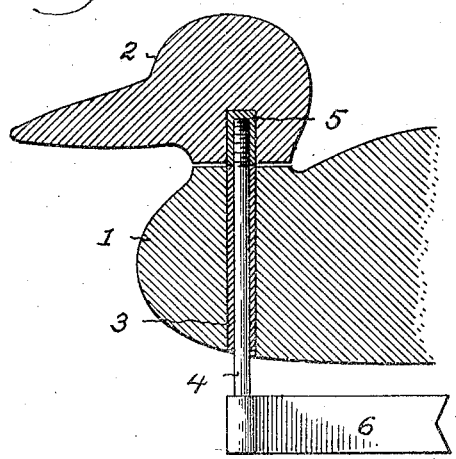
Fig. 2, is an enlarged detail longitudinal section of the forward portion of the same.
Figure 3:
Fig. 3, is a detail top view of a modified form of the operating vane or blade.

The vane or blade 6 may have the form of a flat strip, as shown in Figs. 1 and 2, or it may have a sinuous form 7, as shown in Fig. 3, when an increased surface is desired for the wave or surge of the body of water in which the decoy floats.

Having thus fully described my invention what I claim and desire to secure by Letters Patent, is:—

1. A decoy duck of the type described, comprising a body portion, a head portion formed separate from said body portion, a vertical stem passing through said body portion and journalled therein with its upper end fixedly attached to the aforesaid head portion, and a vane attached to the lower end of said stem, to receive the surge or wave of the water in which the decoy is used.

2. A decoy duck of the type described comprising a body portion provided with a vertical journal bushing, a head portion formed separate from said body portion and provided with a receiving nipple, a vertical stem arranged in said journal bushing and having fixed attachment at its upper end with the nipple of the head portion aforesaid, and a vane attached to the lower end of said stem.

3. A decoy duck of the type described comprising a body portion provided with a vertical journal bushing, a head portion formed separate from said body portion and provided with an internally screw threaded nipple, a vertical stem arranged in said journal bushing and having a screw threaded upper end for fixed engagement in the aforesaid nipple, and a vane attached to the lower end of said stem.

Signed at Chicago, Illinois, this 27th day of October, 1925.

JOHN B. PITTS,